United States Patent
Lee et al.

(10) Patent No.: US 11,258,616 B2
(45) Date of Patent: Feb. 22, 2022

(54) DECENTRALIZED KEY MANAGEMENT SYSTEM AND METHOD

(71) Applicant: SAMSUNG SDS CO., LTD., Seoul (KR)

(72) Inventors: Hyo Jung Lee, Seoul (KR); Chang Suk Yoon, Seoul (KR); Jung Woo Cho, Seoul (KR); Young Woon Kwon, Seoul (KR); Kwang Cheol Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 113 days.

(21) Appl. No.: 16/885,480

(22) Filed: May 28, 2020

(65) Prior Publication Data

US 2021/0359866 A1 Nov. 18, 2021

(30) Foreign Application Priority Data

May 15, 2020 (KR) .......................... 10-2020-0058534

(51) Int. Cl.
*H04L 9/32* (2006.01)
*H04L 9/08* (2006.01)
*H04L 9/06* (2006.01)

(52) U.S. Cl.
CPC .......... *H04L 9/3263* (2013.01); *H04L 9/0637* (2013.01); *H04L 9/0838* (2013.01); *H04L 9/0894* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,769,801 B2 * | 9/2017 | Kim | H04W 4/70 |
| 2015/0358824 A1 * | 12/2015 | Kim | H04L 63/101 726/4 |
| 2017/0104589 A1 * | 4/2017 | Lambert | H04W 4/40 |
| 2017/0257221 A1 * | 9/2017 | Peng | H04L 9/3265 |
| 2019/0288995 A1 * | 9/2019 | Bose | H04L 63/083 |

FOREIGN PATENT DOCUMENTS

KR 10-2071402 B1 3/2020

\* cited by examiner

*Primary Examiner* — Eleni A Shiferaw
*Assistant Examiner* — Bassam A Noaman
(74) *Attorney, Agent, or Firm* — The PL Law Group, PLLC

(57) ABSTRACT

A decentralized key management system according to an embodiment of the present disclosure includes a bootstrap for generating a key and obtaining a certificate corresponding to the generated key, a memory for receiving the key and the certificate from the bootstrap and storing the key and the certificate, a container, in response to a mount command of the bootstrap, for reading the key and the certificate from the memory and being mounted with the key and the certificate, and a controller for generating the bootstrap, and deleting the bootstrap after the container mounts the key and the certificate.

14 Claims, 9 Drawing Sheets

DECENTRALIZED KEY MANAGEMENT SYSTEM AND METHOD

CROSS REFERENCE TO RELATED APPLICATIONS AND CLAIM OF PRIORITY

This application claims the benefit under 35 USC § 119(a) of Korean Patent Application No. 10-2020-0058534, filed on May 15, 2020, in the Korean Intellectual Property Office, the entire disclosure of which is incorporated herein by reference for all purposes.

FIELD

This disclosure relates to a decentralized key management system and method. More specifically, it relates to a decentralized key management system and method, in which individual local devices manage their keys and certificates without a centralized key management system.

DESCRIPTION OF THE RELATED ART

Blockchain is a data management technology, in which continuously increasing data are recorded in blocks of a specific unit and each blockchain node constituting a peer-to-peer network manages blocks as a data structure in the form of a chain. Blockchain can ensure the integrity and security of transactions through a consensus process, in which all blockchain nodes belonging to the network verify and record all transactions.

Blockchain nodes authenticate their identity to the blockchain network or to other blockchain nodes with their keys and certificates when participating in the blockchain network. The key and certificate of each blockchain node are collected by a key management system (KMS) and stored separately in a security medium called a hardware security module (HSM). The key management system encrypts the collected keys and certificates of the blockchain nodes and stores them in the HSM, and retrieves the keys and certificates stored in the HSM and decrypts and provides them to the blockchain node when the blockchain node requests the key and certificate.

However, in such a conventional key management system, since the keys and certificates of all blockchain nodes are concentrated in one key management system, when the key management system is subjected to an external attack, there is a risk of the entire blockchain network being incapacitated due to the keys and certificates of all blockchain nodes being deleted or leaked (Single Points of Failure).

Further, whenever a new blockchain node is generated, a blockchain node is deleted, or a deleted blockchain node is restored, the key and certificate of the corresponding blockchain node have to be newly registered or deleted or the existing key and certificate have to be deleted and registered again in the central key management system, and thus it had a problem in terms of management efficiency. In particular, such inefficiency was more pronounced in a blockchain system where each blockchain node is frequently generated, deleted, and restored.

Accordingly, there has been a growing demand for a new key management system that solves the single points of failure problem and improves the management efficiency of keys and certificates.

SUMMARY

The technical problem to be solved through some embodiments of the present disclosure is to provide a decentralized key management system and method for resolving the conventional single points of failure problem by an individual blockchain node distributed managing its key and certificate.

Another technical problem to be solved through some embodiments of the present disclosure is to provide a key management system and method for improving management efficiency by simply and efficiently performing a related key and certificate management when a blockchain node is generated, deleted and restored.

Another technical problem to be solved through some embodiments of the present disclosure is to provide a security-enhanced key management system and method capable of safely managing keys and certificates without using an expensive HSM.

The technical problems of the present disclosure are not limited to the technical problems mentioned above, and other technical problems not mentioned will be clearly understood by those skilled in the art from the following description.

According to embodiments of the present disclosure to resolve the technical problems, a decentralized key management system comprises a bootstrap for generating a key and obtaining a certificate corresponding to the generated key, a memory for receiving the key and the certificate from the bootstrap and storing the key and the certificate, a container, in response to a mount command of the bootstrap, for reading the key and the certificate from the memory and mounting the key and the certificate, and a controller for generating the bootstrap, and deleting the bootstrap after the container mounts the key and the certificate.

According to embodiments of the present disclosure to resolve the technical problems, a decentralized key management method is performed by a computing device, the method comprises generating a bootstrap, generating a key using the bootstrap and obtaining a certificate corresponding to the generated key, storing the key and the certificate in a memory, mounting the key and the certificate stored in the memory to a container, and deleting the bootstrap after mounting the key and the certificate.

According to embodiments of the present disclosure to resolve the technical problems, a computer program for driving a decentralized key management system is stored in a computer readable recording medium for executing steps comprising: generating a bootstrap, generating a key using the bootstrap, and obtaining a certificate corresponding to the generated key, storing the key and the certificate in a memory, mounting the key and the certificate stored in the memory to a container, and deleting the bootstrap after mounting the key and the certificate.

DETAILED DESCRIPTION

Figure 1:
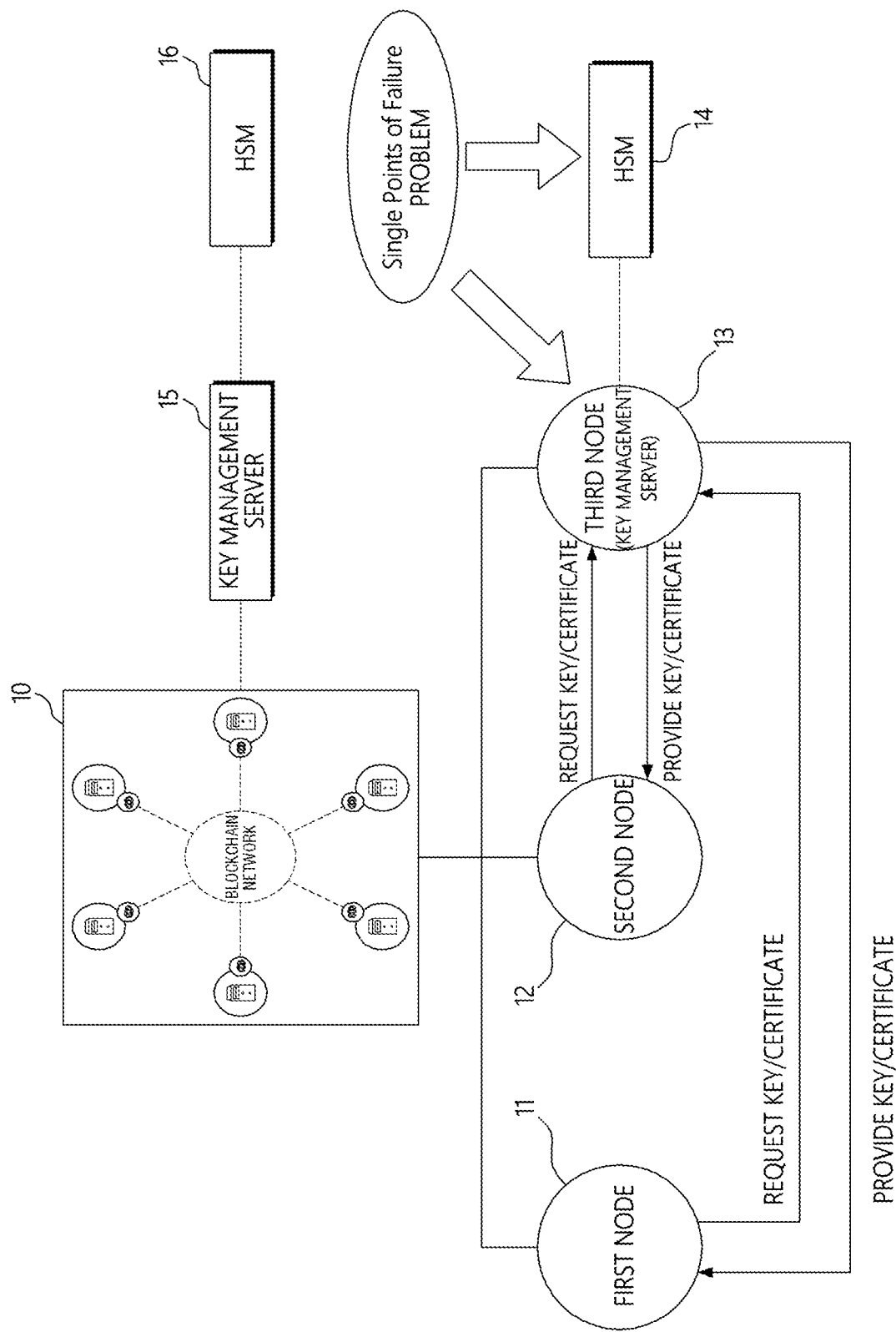
FIG. 1 is a diagram for describing the operation of the conventional key management system and the various resulting problems.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a diagram for describing the operation of the conventional key management system and the various resulting problems. FIG. 1 shows a conventional key management system for a blockchain system.

The blockchain network 10 is a system that performs necessary transaction and computation processing using the computing power of a plurality of blockchain nodes, and may include a plurality of blockchain nodes 11, 12, and 13. Each blockchain node 11, 12, 13 configures a blockchain network 300 having a peer-to-peer (P2P) structure, and operates according to the blockchain protocol. Each blockchain node 11, 12, 13 may share various smart contract and transaction data through the blockchain network 10, and ensure the integrity and security of transactions through a consensus process.

Each blockchain node 11, 12, 13 authenticates its identity to prove that it is a proper node when participating in the blockchain network 10. To this end, each blockchain node 11, 12, 13 is issued a key and a certificate for identity authentication through a key management server 13, and the key and certificate are collected and stored in a separate security medium 14 accessible by the key management server 13. Each blockchain node 11, 12 requests a key and a certificate from the key management server 13 when identity authentication is required, and the key management server 13 reads the key and certificate from the security medium 14 and provides them to the requesting blockchain nodes 11 and 12 after decryption.

As an embodiment, the security medium 14 may be a storage medium with enhanced security, such as a hardware security module (HSM).

As an embodiment, the key management server 13 may be any one node (for example, a third node) of the blockchain nodes 11, 12, 13, but is not limited thereto. For example, a separate key management server 15 connected to the blockchain network 10 is provided, and keys and certificates of the blockchain nodes 11, 12, and 13 can be collected through the key management server 15 and stored in the security medium 16 accessible by the key management server 15.

However, this conventional key management method had several serious problems. First, since the keys and certificates of all the blockchain nodes 11, 12, 13 are stored and managed in one place, when there is a problem with the key management server 13 or the security medium 14 that stores and manages them, the problem of single points of failure that the entire blockchain network 10 cannot operate may occur. In addition, since the keys and the certificates are stored in one place, the security problem that the entire keys and certificates of the blockchain network 10 can be leaked only by a hacking attack on the specific devices 13 and 14 is implied.

Second, since one key management server 13 manages the keys and certificates of all blockchain nodes 11, 12, and 13, there is a management problem that a central key management server 13 should continuously update and store the key and certificate of a corresponding blockchain node whenever a blockchain node is newly generated, deleted or restored. The blockchain network 10 is a system comprising a plurality of blockchain nodes, and the network structure is frequently changed, such as a new blockchain node being added or an existing blockchain node being deleted at all times. Accordingly, if the key and certificate management is performed in one central key management server 13, it is difficult to flexibly respond to changes in the blockchain network structure, and thus the efficiency of key and certificate management can be greatly reduced.

Third, in the case of the security medium 14, since the keys and certificates of the entire blockchain nodes 11, 12, and 13 are stored, a storage medium with greatly enhanced security (for example, HSM) needs to be used. There is a problem that its price is quite expensive and it is difficult to immediately repair it when a failure or damage occurs due to the nature of the hardware.

Hereinafter, a key management system for solving the problems of the conventional key management system and significantly improving security and management efficiency at a low cost is proposed.

Figure 2:
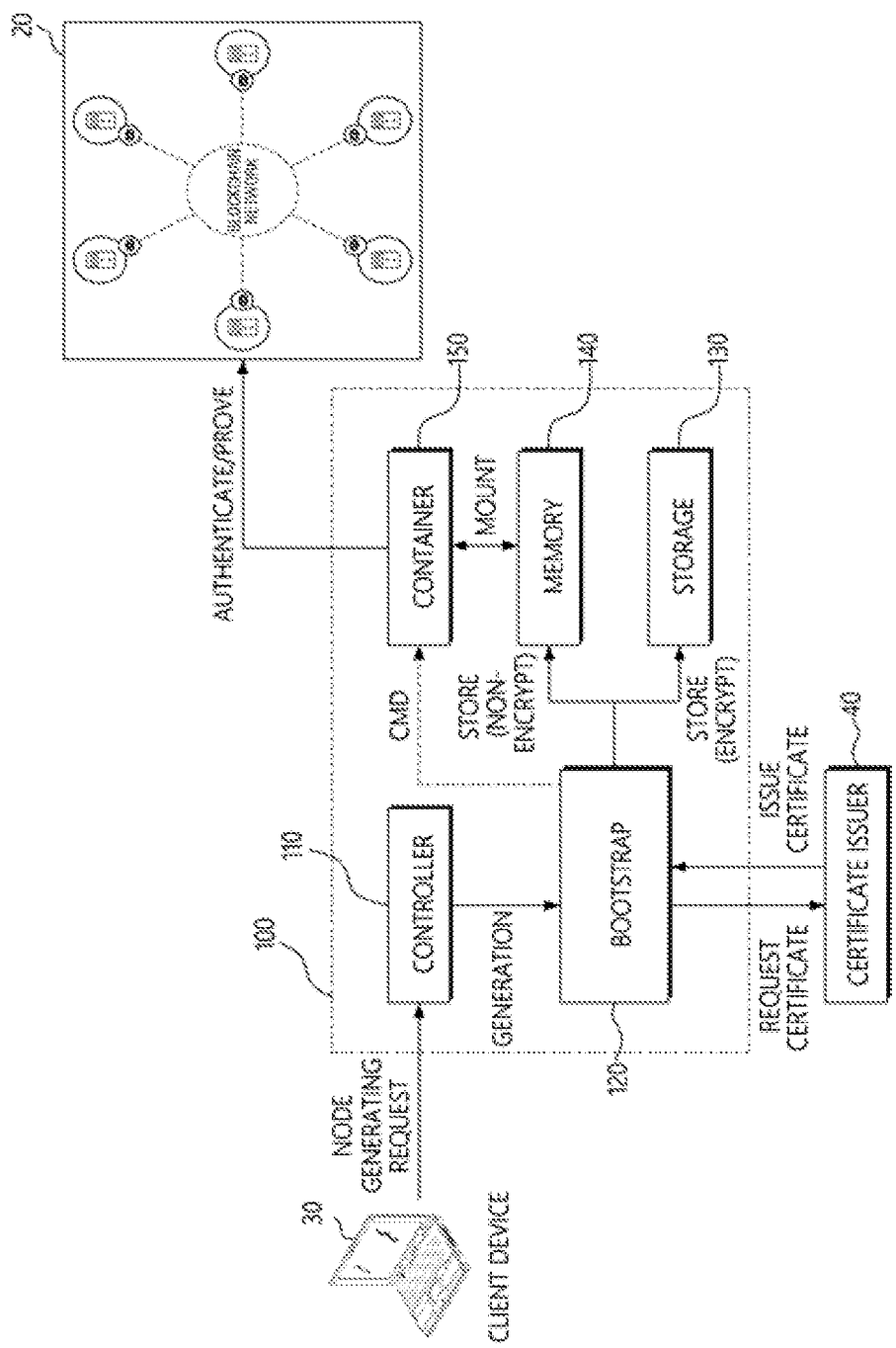
FIG. 2 is a block diagram showing the configuration and operation of a key management system according to an embodiment of the present disclosure.

FIG. 2 is a block diagram shoeing the configuration and operation of a key management system according to an embodiment of the present disclosure. Referring to FIG. 2, the key management system 100 includes a controller 110, a bootstrap 120, a storage 130, a memory 140, and a container 150.

For the specificity of the description, in this embodiment, the key management system 100 is illustrated as being a blockchain node constituting the blockchain network 20, but the scope of the present disclosure is not limited thereto. For example, the key management system 100 according to the present disclosure can be applied to any place where a decentralized key management method is required in addition to the blockchain system.

Hereinafter, functions and operations of each component 110, 120, 130, 140, 150 will be described with reference to the drawings.

The controller 110 is a device that controls the overall operation of the key management device 100, and may be a central processing unit (CPU), but is not limited thereto. The controller 110 may generate or delete the bootstrap 120 and control the bootstrap 120 such that the bootstrap 120 performs a specific operation. For example, the controller 110 may generate a bootstrap 120 in response to a node generating request from the client device 30, and control the bootstrap 120 to obtain the key and certificate of a blockchain node, to which the key management system 100 belongs (for example, 11, 12 or 13 in FIG. 1), Further, as will be described later, the controller 110 may delete the bootstrap 120 after completing the generation of the blockchain node using the obtained key and certificate.

The bootstrap 120 is a software module that is temporarily generated and driven to obtain keys and certificates. For example, bootstrap 120 may be an application coded to perform a series of processes for obtaining a key and certificate.

The bootstrap 120 first generates a unique key of the key management device 100. Then, the bootstrap 120 requests the certificate from the certificate issuer 40 using the generated key, and receives and obtains the certificate issued by the certificate issuer 40.

As an embodiment, the key generated by the bootstrap 120 may be a pair of asymmetric encryption keys including a public key and a private key. At this time, the bootstrap 120 requests the certificate from the certificate issuer 40 together the generated public key, and also sends a document signed with the previously generated private key to prove that it has the private key. The certificate issuer 40 authenticates the identity of the key management device 100 and confirms the signed document, and then generates a certificate by signing the document including the public key, user information about the key management device 100, and authentication information and issue it to the bootstrap 120. Subsequently, the bootstrap 120 uses the issued certificate when it is necessary to confirm that the public key is own in the proof of identity.

As an embodiment, the bootstrap 120 may encrypt and store the generated key. At this time, the key to be encrypted may be a private key among a pair of encryption keys generated by the bootstrap 120.

When a certificate is obtained from the certificate issuer 40, the bootstrap 120 stores the key generated by itself and the issued certificate in the storage 130.

The storage 130 receives and stores the key and certificate from the bootstrap 120. At this time, the key stored by the storage 130 is a key encrypted by the bootstrap 120 for security. After completing storage of the key and certificate, the storage 130 returns a signal to the bootstrap 120 that it has been completed.

As an embodiment, the storage 130 may be an authorized hard disk drive with limited access permission so that only the bootstrap 120 can access it.

The memory 140 is also a component that receives and stores keys and certificates from the bootstrap 120. When the bootstrap 120 receives the completion signal from the storage 130, the key and certificate are then stored again in the memory 140. At this time, the key stored in the memory 140 is an unencrypted plain text key, and the bootstrap 120 decrypts the previously encrypted key and provides it to the memory 140. The memory 120 is a storage medium that temporarily stores keys and certificates, and may be, for example, a flash memory, but is not limited thereto. On the other hand, as in the case of the storage 130, the memory 140 returns a signal to notify the bootstrap 120 after storage of the key and certificate is completed.

The container 150 is a computing environment or module capable of driving an application, and reads and mounts keys and certificates stored in memory 140, and then configures a node of blockchain network 20 based thereon. Generally, a container means a computing environment or module that virtualizes an environment capable of driving an application as a computing element that is driven by receiving appropriate computing resources as needed. A container can configure a computing environment isolated from other containers or other components, and can implement an on-premises environment using various virtualization based technologies such as Linux Container (LXC), Libcontainer, CGroup, Namespaces or SELinux.

The container 150 of FIG. 2 is a computing element that generates a blockchain node, and is preferably configured as a container according to the virtualization technology described above, but is not limited thereto. For example, the container 150 is a general application driving module although it is referred to as a container, and may be a component independent of the container according to the virtualization technology.

After receiving the return signal from the memory 140, the bootstrap 120 issues a command (CMD) to mount the key and certificate to the container 150. The container 150 reads a key and a certificate stored in the memory 140 and mounts them in response to a mount command (CMD). Then, the container 150 returns a signal to the bootstrap 120 that the mount has been successfully completed. Subsequently, the container 150 generates a blockchain node and performs authentication of the generated node using the mounted key and certificate.

Meanwhile, when the bootstrap 120 receives the return signal from the container, the bootstrap 120 replies a return signal indicating that the series of node generating operations (or key and certificate mounting operations) has been successfully completed.

According to the return signal from the bootstrap 120, the controller 110 regards that the bootstrap 120 has finished the role and deletes the bootstrap 120.

The reason why the controller 110 deletes the bootstrap 120 is to safely protect the keys and certificates stored in the storage 130 and the memory 140. This will be described with reference to FIG. 3.

Figure 3:
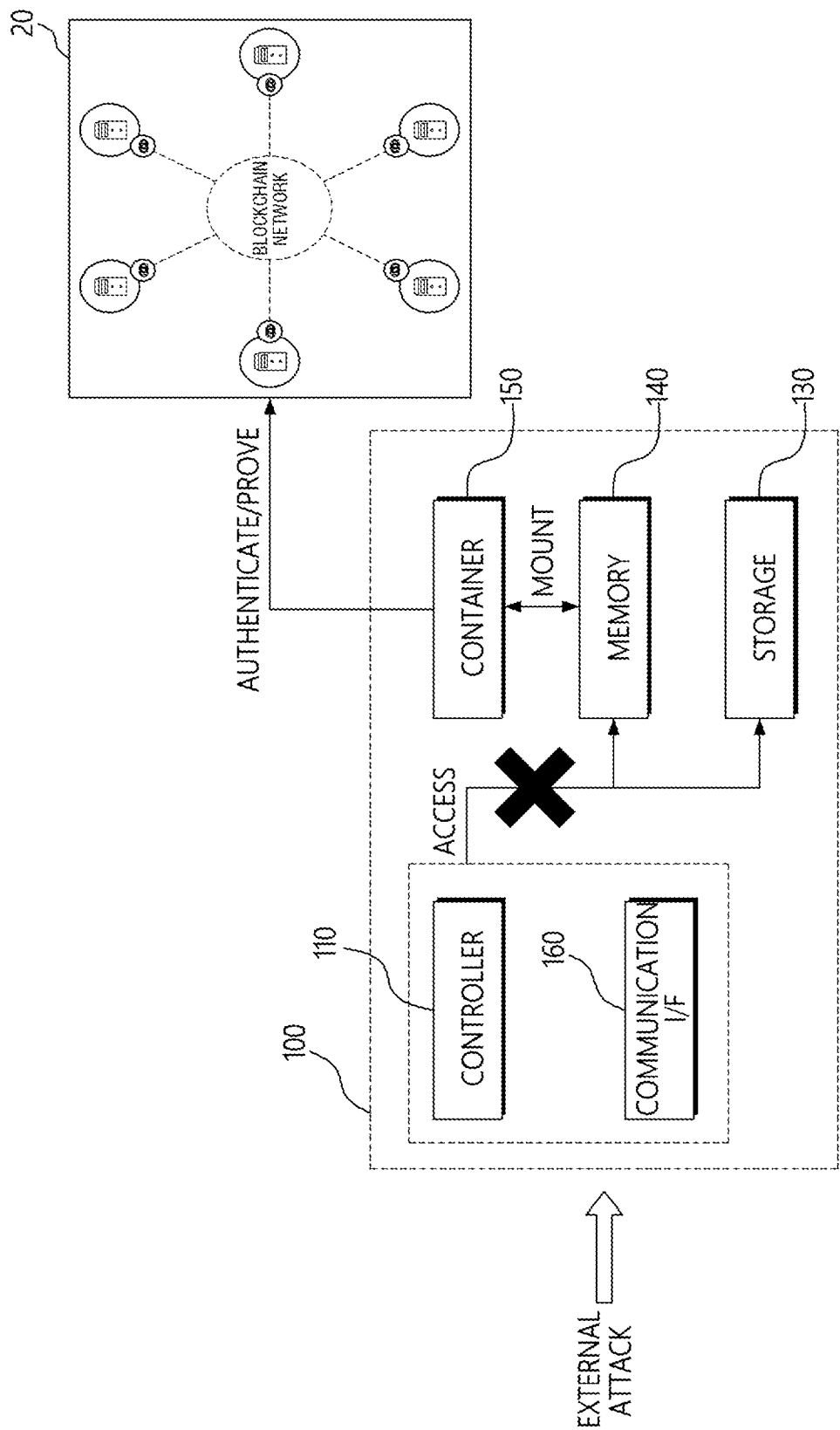
FIG. 3 is a diagram for describing how each component 130, 140, and 150 is protected from external attacks when the key management system 100 of FIG. 2 deletes the bootstrap 120.

FIG. 3 shows a key management system 100, in which the bootstrap 120 is deleted after mounting the key and the certificate to the container 150. In the present embodiment, it is assumed that the memory 140 and the storage 130 are limited in access so that they are accessible only through the bootstrap 120. For example, the storage 130 is accessible and readable/writable only through the bootstrap 120, and not accessible through other components. Similarly, the memory 140 is also accessible and readable/writable only through the bootstrap 120, and not accessible through other components. However, the memory 140 may allow limited access when the container 150 reads and mounts the key and the certificate stored in the memory 140.

Under this assumption, referring to the drawings, since the bootstrap 120 is deleted and the path to access the storage 130 and the memory 140 disappears, even if the controller 110 of the key management system 100 or other communication interfaces 160 are hacked by external attack, the keys and certificates stored in the storage 130 and the memory 140 may be safely stored. As described above, if the bootstrap 120 is set as the only path for accessing the key and the certificate, and deleted after the key and the certificate are mounted, it can be much safer from a hacking attack or the like.

On the other hand, after the bootstrap 120 is deleted, there may be the case that the key and the certificate loaded in the memory 140 and the container 150 are deleted or unusable because the key management system 100 is down or the like.

In this case, the controller 110 generates again the bootstrap 120 in order to restore the key and the certificate, and easily restores the key and certificate in the way of reading the key and certificate stored in the storage 130 through the bootstrap 120 generated again, and then sequentially storing again them in the memo y 140 and mounting again them to the container 150. The method of restoring the deleted key and certificate will be described in more detail in FIGS. 7 and 8, and thus further description thereof will be omitted.

According to the present disclosure described above, since an individual blockchain node (or a key management system attached thereto) distributed manages its own key and certificate, the remaining blockchain nodes can operate normally even if any node goes down, and thus it is possible to solve the single points of failure problem of the conventional key management system.

Further, since an individual blockchain node distributed manages a key and certificate, management inefficiencies of the conventional centralized key management system are improved. In particular, in the case of restoring the deleted keys and certificates, this can be easily done simply by retrieving the stored keys and certificates and mounting again them, which greatly improves the efficiency of key and certificate management.

Further, after the mounting of the key and certificate is completed, the stored key and certificate can be safely protected from external hacking by deleting the bootstrap, so that the key and certificate can be safely managed without using an expensive HSM.

Figure 4:
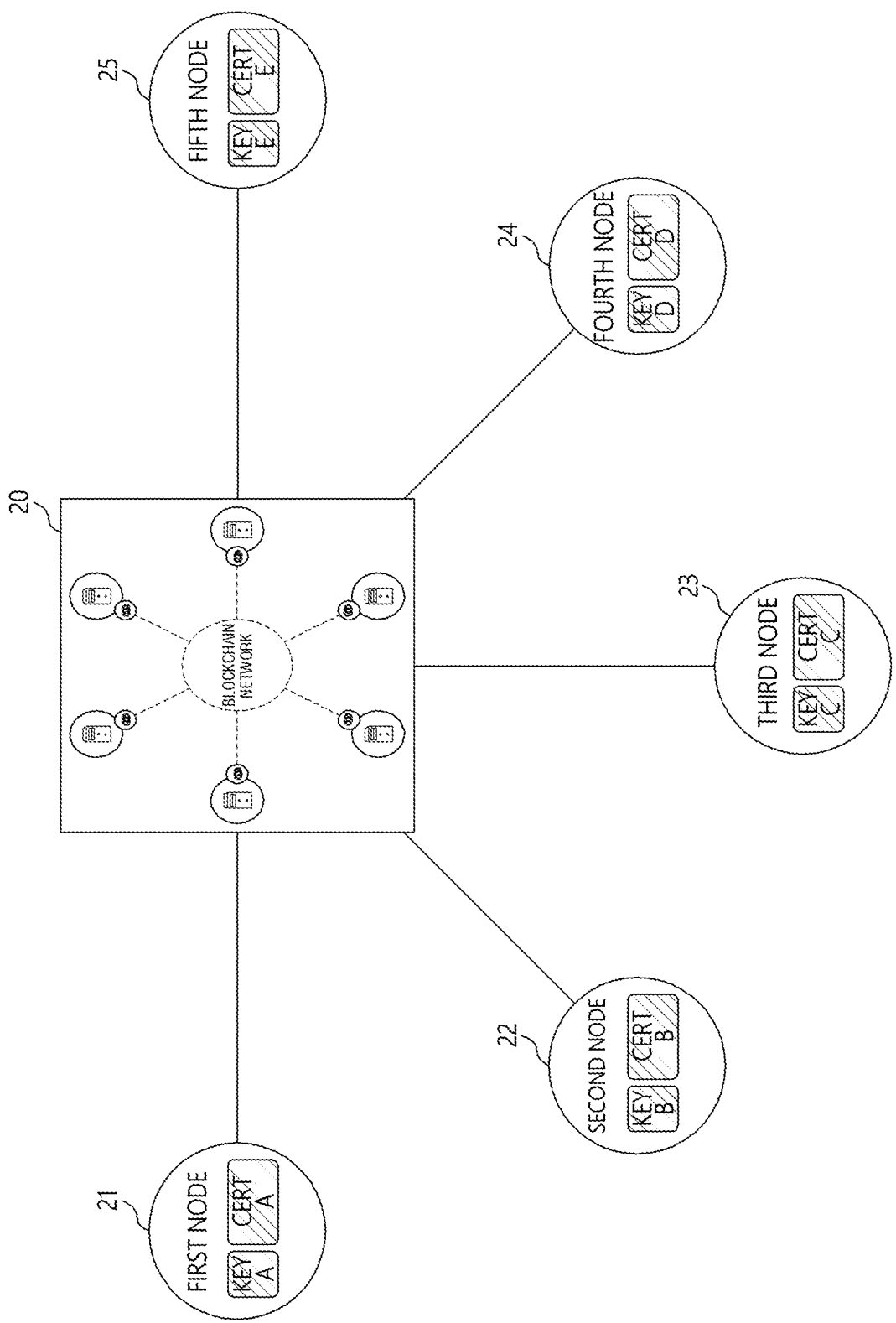
FIG. 4 is a diagram illustrating a blockchain network environment, to which the decentralized key management system 100 according to the present disclosure is applied.

FIG. 4 is a diagram illustrating a blockchain network environment, to which the decentralized key management system 100 according to the present disclosure is applied. Referring to FIG. 4, a plurality of nodes 21, 22, 23, 24, and 25 are illustrated as nodes of the blockchain network 20.

When the key management system 100 according to the present disclosure is applied, each node 21, 22, 23, 24, 25 stores and manages its own key and certificate by itself and a separate centralized key management system or a security medium for collecting and storing keys is not needed. Therefore, since the fundamental reason causing the single points of failure problem may disappear, even if a specific node is attacked or down, the operation of the entire blockchain system is not disturbed and a stable blockchain service can be provided.

Figure 5:
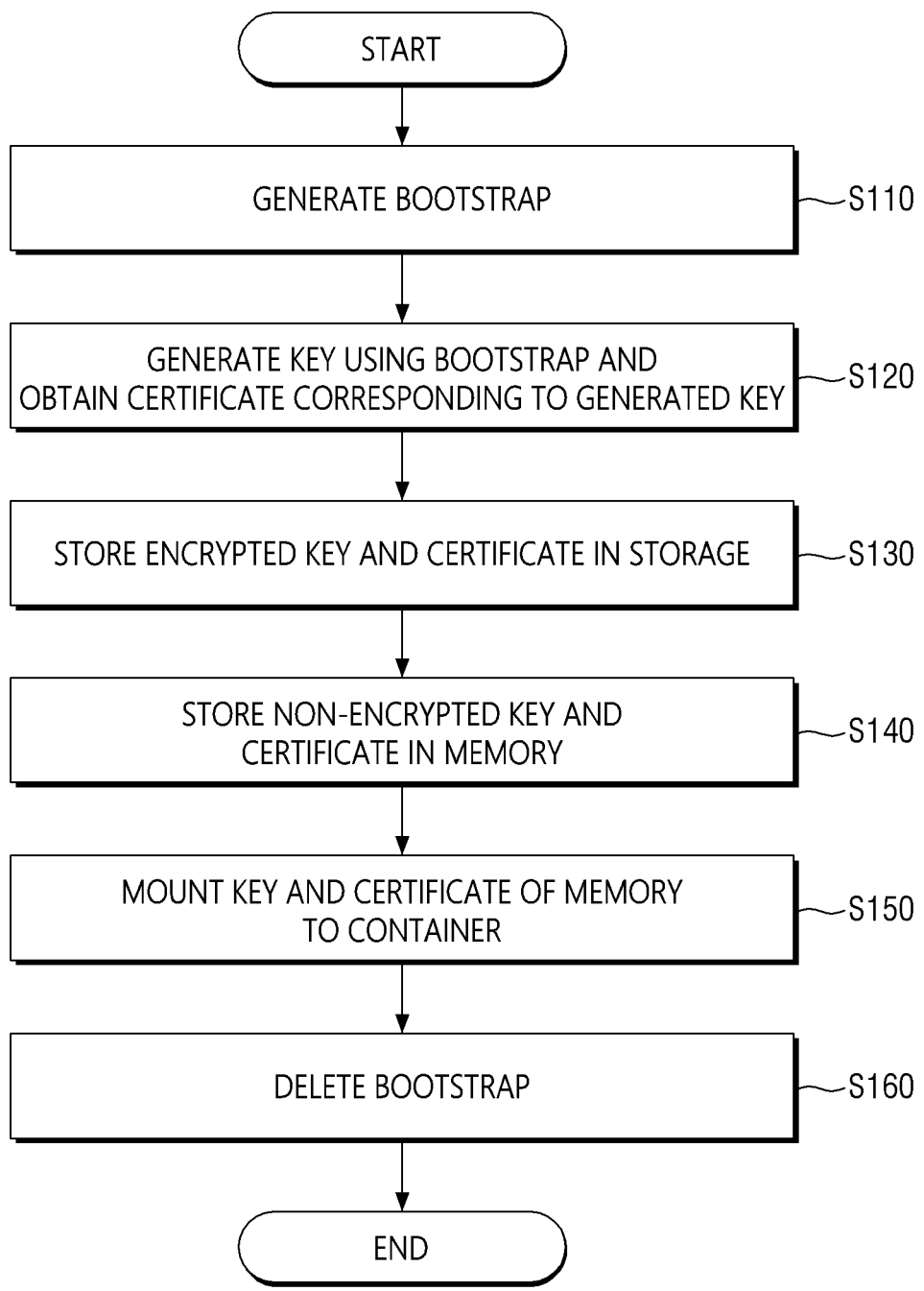
FIG. 5 is a flowchart illustrating a decentralized key management method when generating a blockchain node according to an embodiment of the present disclosure.

FIG. 5 is a flowchart illustrating a decentralized key management method when generating a blockchain node according to an embodiment of the present disclosure. In FIG. 5, a series of steps for generating a key for the first time, obtaining a certificate, and mounting it to a container when the key management device 100 described above generates a blockchain node is described. Therefore, if the subject is not specified in the following steps, it is assumed that the subject is the key management device 100.

In step S110, the key management device 100 generates the bootstrap 120. At this time, in response to the node generating request of the client device 30, the key management device 100 may generate a bootstrap 20 to obtain a key and a certificate required for the node generating request.

In step S120, the key management device 100 generates a key using the bootstrap 120, and receives a certificate corresponding to the generated key issued from the certificate issuer 40. At this time, the bootstrap 120 may encrypt and store the generated key.

In step S130, the key management device 100 stores the encrypted key and certificate in the storage 130. When the storage of the key and the certificate is completed, the storage 130 returns a signal for that to the bootstrap 120.

In step S140, the key management device 100 decrypts the encrypted key, and then stores the decrypted (i.e., unencrypted) key and certificate in the memory 140. When the storage of the key and the certificate is completed, the storage 130 returns a signal for that to the bootstrap 120.

In step S150, the key management device 100 issues a mount command to the container 150 so that the container 150 mounts the key and the certificate stored in the memory 140.

In step S160, the key management device 100 deletes the bootstrap 120 to safely protect the storage 130 and the memory 140 when the mounting of the key and certificate is successfully completed.

Figure 6:
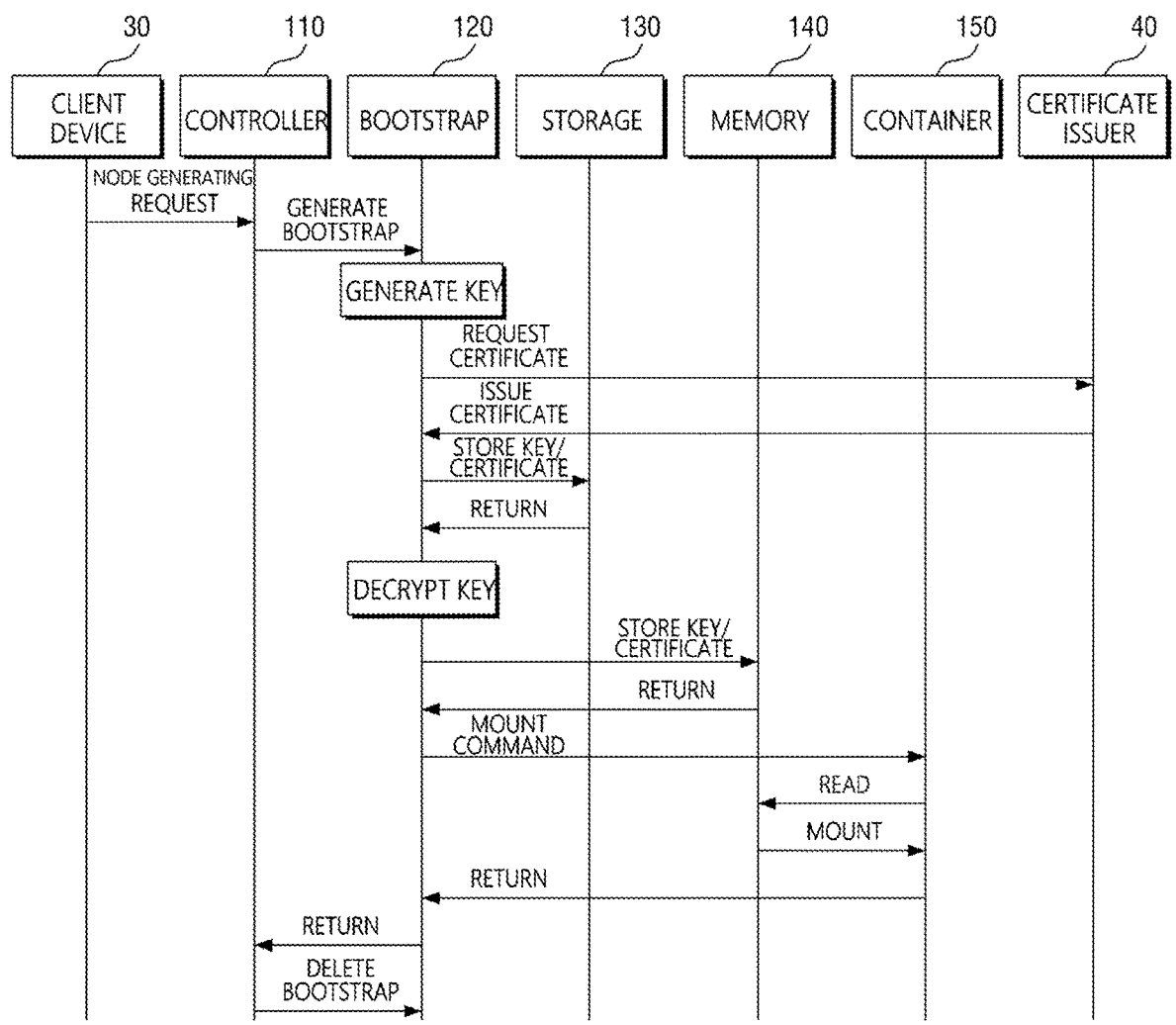
FIG. 6 is a flowchart illustrating the decentralized key management method of FIG. 5 focusing on sequential interaction between each component.

FIG. 6 is a flowchart for describing in detail the decentralized key management method of FIG. 5 focusing on sequential interaction between each component. It will be described below with reference to the drawings.

First, the client device 30 requests the controller 110 to generate a node. The controller 110 generates the bootstrap 120 in response to the node generating request.

The bootstrap 120 generates a key and requests the certificate issuer 40 to issue a certificate using the generated key. At this time, the bootstrap 120 may encrypt and store the generated key.

When a certificate is issued from the certificate issuer 40, the bootstrap 120 stores the key and certificate in the storage 130. Then, it waits for a return signal from the storage 130 that the key and certificate have been successfully stored, and then decrypts again the previously encrypted key. This is to provide the key to the memory 140 in the form of a plain text.

When the key is decrypted, the bootstrap 120 stores the key and certificate in the memory 140. Then, it waits for a return signal from the memory 140 that the key and certificate have been successfully stored, and transmits a mount command to the container 150 to mount the key and certificate.

The container 150 reads and mounts the key and certificate stored in the memory 140 in response to the mount command of the bootstrap 120. Then, when the mounting is completed, a return signal for that is transmitted to the bootstrap 120.

When receiving the return signal from the container 150, the bootstrap 120 returns a signal to the controller 110 that all of the scheduled tasks of the bootstrap 120 have been completed. Thereafter, the controller 110 confirms the return signal of the bootstrap 120 and deletes the bootstrap 120, and the present embodiment ends.

Figure 7:
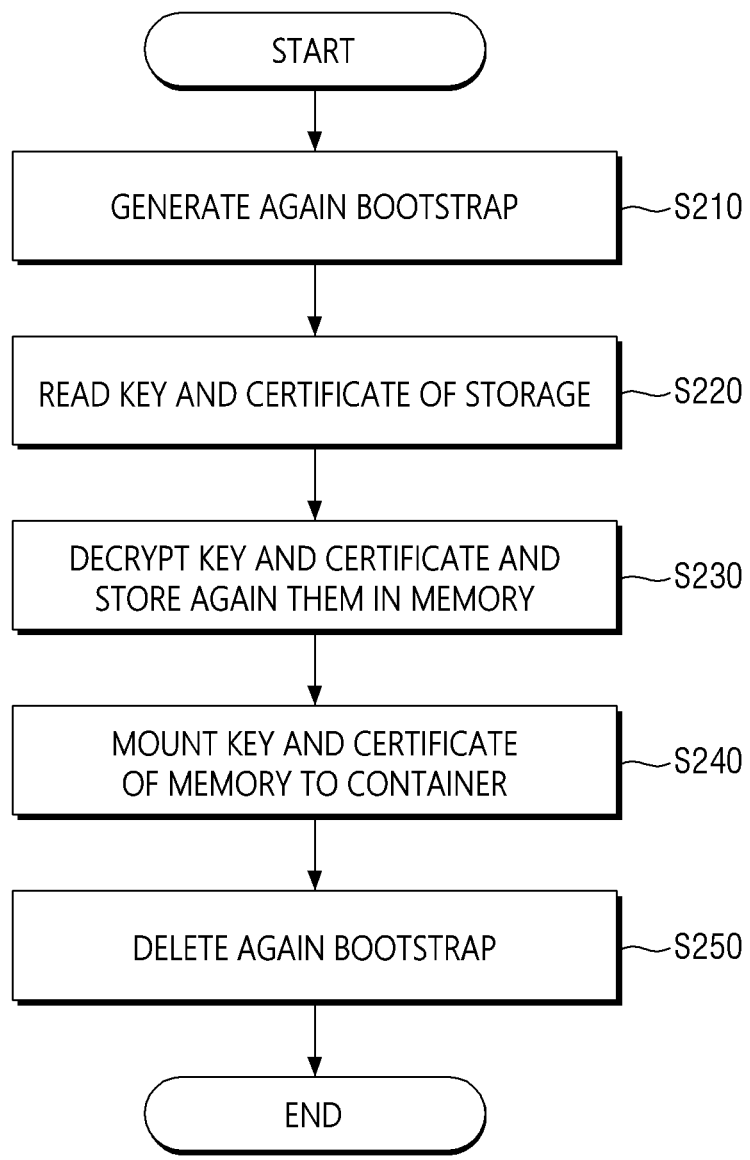
FIG. 7 is a flowchart illustrating a decentralized key management method when restoring a blockchain node according to an embodiment of the present disclosure.

FIG. 7 is a flowchart illustrating a decentralized key management method when restoring a blockchain node according to an embodiment of the present disclosure. In FIG. 7, a series of steps for retrieving and restoring keys and certificates from the storage 130 when keys and certificates of the memory 140 and the container 150 are deleted are described. As in FIG. 5, when a subject is not specified in the following steps, it is assumed that the subject is the key management device 100.

In step S210, the key management device 100 generates again the bootstrap 120 to restore the deleted key and certificate. Then, the command to restore the key and certificate is transmitted to the bootstrap 120.

In step S220, the key management device 100 reads the key and certificate stored in the storage 130 through the bootstrap 120.

In step S230, the key management device 100 decrypts the read key to form a plain text, and then stores it in the memory 140 together with the certificate.

In step S240, the key management device 100 issues a mount command to the container 150 so that the container 150 mounts the key and the certificate stored in the memory 140.

In step S250, when the restoring operation is successfully completed by the container 150 mounting the key and the certificate, the key management device 100 deletes again the bootstrap 120.

Figure 8:
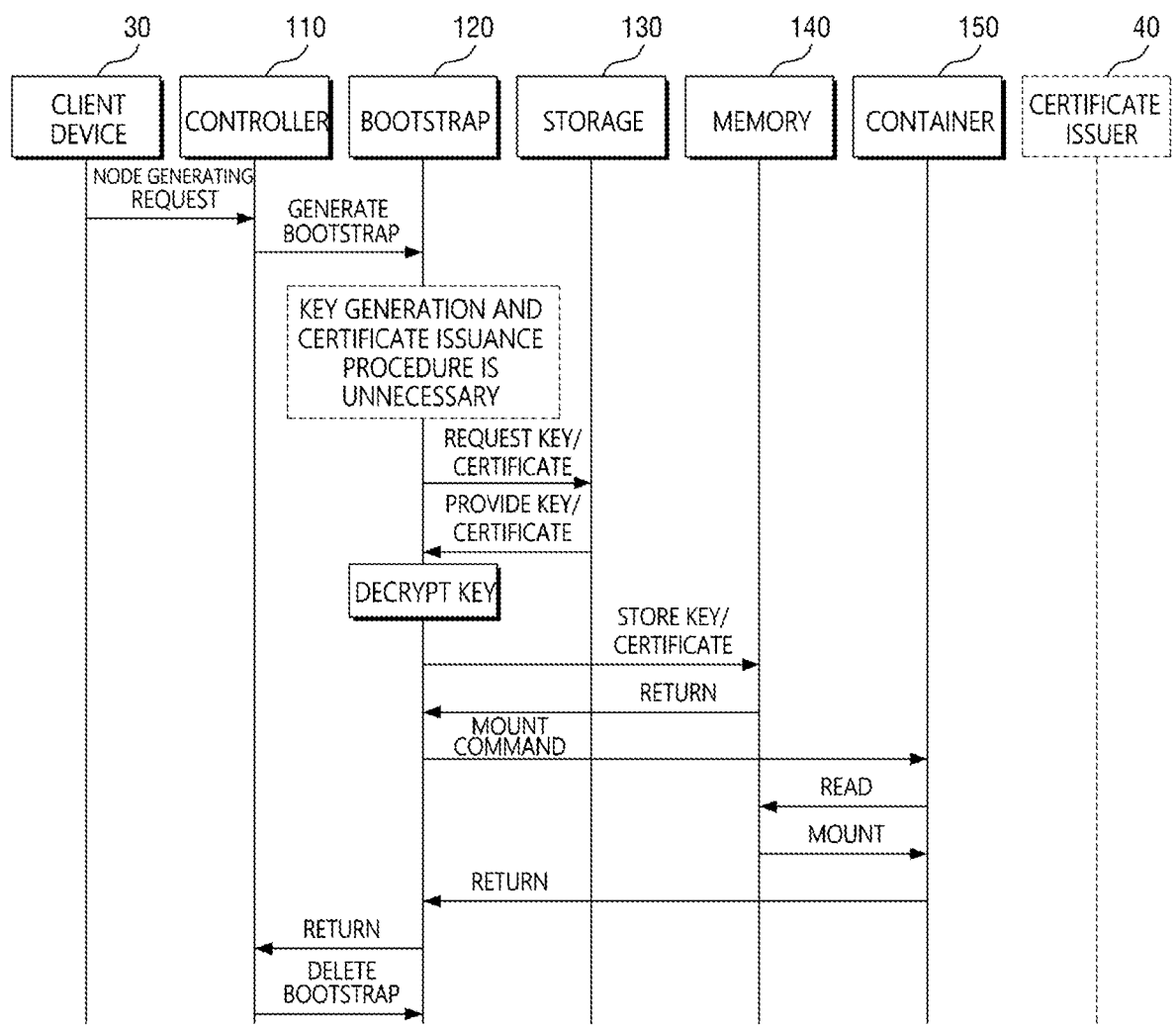
FIG. 8 is a flowchart illustrating the decentralized key management method of FIG. 7 focusing on sequential interaction between each component.

FIG. 8 is a flowchart for describing in detail the decentralized key management method of FIG. 7 focusing on sequential interaction between each component. It will be described below with reference to the drawings.

First, the client device 30 requests the controller 110 to generate a node for node restoration. The controller 110 venerates again the bootstrap 120 in response to the node generating request.

Unlike the embodiment of FIG. 6, keys and certificates of the key management device 100 are already stored in the storage 130. Therefore, in this embodiment, a key generation and certificate issuance procedure is unnecessary, and thus the step of issuing a certificate through the certificate issuer 40 is skipped.

The bootstrap 120 accesses the storage 130 and requests a key and a certificate stored in the storage 130. The storage 130 provides the bootstrap 120 with the stored key and certificate in response to the request.

The bootstrap 120 decrypts the key provided by the storage 130 and stores the decrypted key and certificate in the memory 140. Then, it waits for a return signal from the memory 140 that the key and certificate have been successfully stored, and transmits a mount command to the container 150 to mount the key and certificate of the memory 140.

The container 150 reads and mounts the key and certificate stored in the memory 140 in response to the mount command of the bootstrap 120. Then, when the mounting is completed, a return signal for that is transmitted to the bootstrap 120.

When the bootstrap 120 receives the return signal from the container 150, the bootstrap 120 returns a signal to the controller 110 that all of the scheduled tasks of the bootstrap 120 have been completed. Thereafter, the controller 110 confirms the return signal of the bootstrap 120 and deletes the bootstrap 120, and the present embodiment ends.

Hereinafter, an exemplary computing device 500 that can implement an apparatus and a system, according to various embodiments of the present disclosure will be described with reference to FIG. 9.

Figure 9:
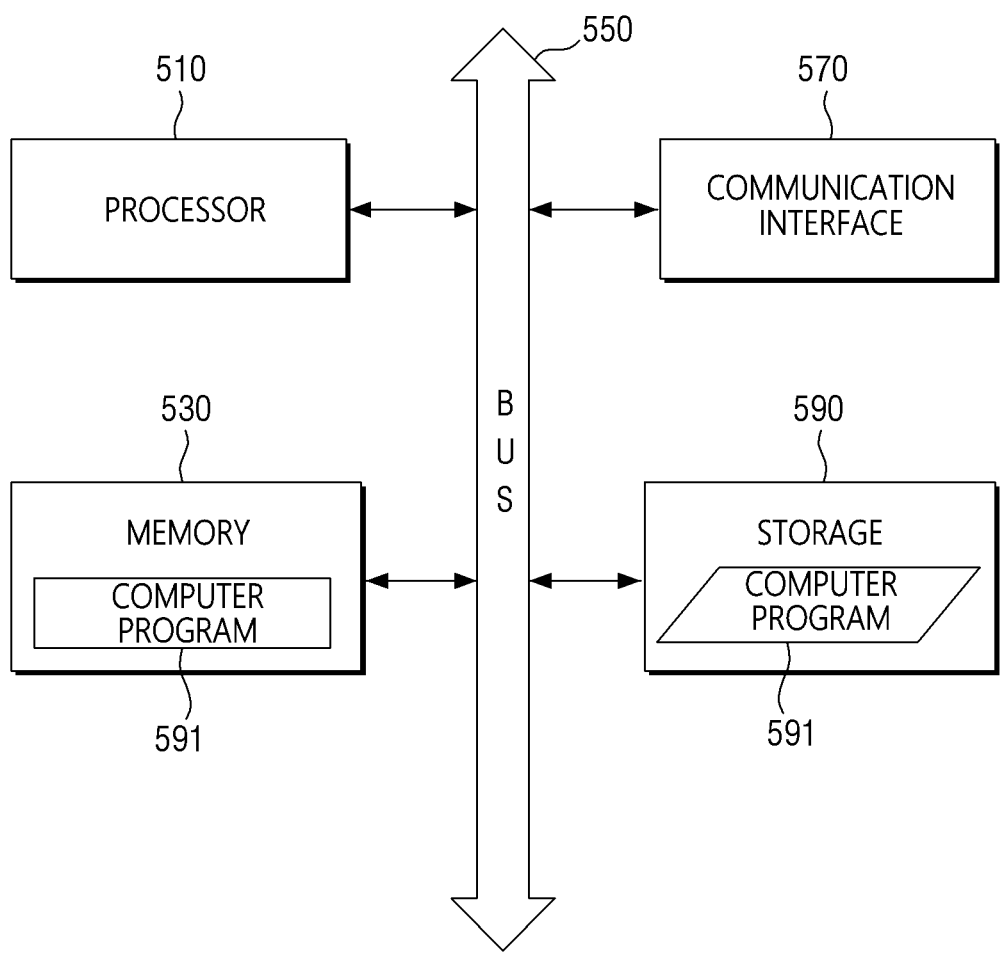
FIG. 9 is a block diagram illustrating an example hardware configuration of a computing device 500, in which various embodiments of the present disclosure are implemented.

FIG. 9 is an example hardware diagram illustrating a computing device 500. The computing device 500 may be, for example, a hardware device which implements the key management system 100 depicted in FIG. 2.

As shown in FIG. 9, the computing device 500 may include one or more processors 510, a bus 550, a communication interface 570, a memory 530, which loads a computer program 591 executed by the processors 510, and a storage 590 for storing the computer program 591. However, FIG. 9 illustrates only the components related to the embodiment of the present disclosure. Therefore, it will be appreciated by those skilled in the art that the present disclosure may further include other general purpose components in addition to the components shown in FIG. 9.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. For example, the computer program 591 for driving a decentralized key management system according to embodiments of the present disclosure may include instructions, which are configured to execute an operation generating a bootstrap, an operation generating a key using the bootstrap and obtaining a certificate corresponding to the generated key, an operation storing the key and the certificate in a memory, an operation mounting the key and the certificate stored in the memory to a container, and an operation deleting the bootstrap after mounting the key and the certificate. When the computer program 591 is loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as interact and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A decentralized key management system comprising:
    a bootstrap software module for generating a key and obtaining a certificate corresponding to the generated key;
    a memory for receiving the key and the certificate from the bootstrap and storing the key and the certificate;
    a container comprising a computer module, in response to a mount command of the bootstrap, for reading the key and the certificate from the memory and being mounted with the key and the certificate;
    a controller for generating the bootstrap, and deleting the bootstrap after the container mounts the key and the certificate;
    a storage for receiving the key and the certificate from the bootstrap and storing the key and the certificate, wherein the controller regenerates the bootstrap when there is a request to restore a node of a blockchain network from a client device after deleting the bootstrap; the regenerated bootstrap reads the key and the certificate from the storage and stores again the key and the certificate in the memory; and
    the container, in response to the regenerated bootstrap, reads the key and the certificate stored again in the memory and re-mounted with the key and the certificate, and restores the node using the re-mounted key and the certificate.

2. The decentralized key management system of claim 1, wherein the memory and the storage are accessible only through the bootstrap except when the container reads the key and the certificate from the memory.

3. The decentralized key management system of claim 1, wherein the bootstrap encrypts the key, and provides the encrypted key to the storage, and provides the key without the encryption to the memory.

4. The decentralized key management system of claim 1, wherein the controller regenerates the bootstrap to restore at least one of the key and the certificate when the at least one of the key and the certificate stored in the memory is deleted.

5. The decentralized key management system of claim 4, wherein the regenerated bootstrap reads the at least one of the key and the certificate from the storage and stores again the at least one of the key and the certificate in the memory; and the container, in response to a mount command of the regenerated bootstrap, reads and mounts the at least one of the key and the certificate stored again in the memory.

6. The decentralized key management system of claim 5, wherein the controller deletes the regenerated bootstrap after the container mounts the at least one of the key and the certificate stored again in the memory.

7. The decentralized key management system of claim 1, wherein the controller, in response to a node generating request from a client device, generates the bootstrap; and the container configures a node of a blockchain network and performs authentication of the node using the mounted key and certificate.

8. The decentralized key management system of claim 1, wherein the controller deletes the regenerated bootstrap after the container restores the node.

9. The decentralized key management system of claim 1, wherein the bootstrap generates a pair of asymmetric encryption keys, and obtains the certificate from a certificate issuer using a public key of the pair of asymmetric encryption keys; and the key is a private key among the pair of asymmetric encryption keys.

10. A decentralized key management method performed by a computing device, comprising:
    generating a bootstrap; generating a key using the bootstrap and obtaining a certificate corresponding to the generated key;
    storing the key and the certificate in a memory;
    mounting the key and the certificate stored in the memory to a container;
    deleting the bootstrap after mounting the key and the certificate;
    storing the key and the certificate in a storage,
    regenerating the bootstrap when there is a request to restore a node of a blockchain network from a client device after deleting the bootstrap;
    reading, with the regenerated bootstrap, the key and the certificate from the storage and storing again the key and the certificate in the memory; and
    in response to the regenerated bootstrap, reading the key and the certificate stored again in the memory and re-mounting the key and the certificate on the container, and restoring the node using the re-mounted key and the certificate.

11. The decentralized key management method of claim 10, further comprising:
    regenerating the bootstrap in response to a request to restore at least one of the key and certificate;
    reading the key and the certificate stored in a storage using the regenerated bootstrap and storing again the key and the certificate in the memory;

re-mounting the key and the certificate stored again in the memory to the container; and deleting the regenerated bootstrap after mounting again the key and the certificate.

12. The decentralized key management method of claim 10, wherein the bootstrap is generated in response to a node generating request from a client device; and the decentralized key management method further comprises configuring a node of a blockchain network and performs authentication of the node using the mounted key and certificate.

13. A computer program for driving a decentralized key management system, the computer program comprising computer-executable code embodied on a non-transitory computer readable recording medium for executing steps comprising:

generating a bootstrap;

generating a key using the bootstrap, and obtaining a certificate corresponding to the generated key;

storing the key and the certificate in a memory;

mounting the key and the certificate stored in the memory to a container;

deleting the bootstrap after mounting the key and the certificate, storing the key and the certificate in a storage, regenerating the bootstrap when there is a request to restore a node of a blockchain network from a client device after deleting the bootstrap; reading, with the regenerated bootstrap, the key and the certificate from the storage and storing again the key and the certificate in the memory; and in response to the regenerated bootstrap, reading the key and the certificate stored again in the memory and re-mounting the key and the certificate on the container, and restoring the node using the re-mounted key and the certificate.

14. The computer program of claim 13, wherein the bootstrap is generated in response to a node generating request from a client device; and the steps further comprises configuring a node of a blockchain network and performs authentication of the node using the mounted key and certificate.

* * * * *